United States Patent
Link

(10) Patent No.: US 6,651,376 B1
(45) Date of Patent: Nov. 25, 2003

(54) METHOD AND APPARATUS FOR ATTRACTING FISH USING A SOUND PRODUCING FISHING ACCESSORY PROVIDING BLIND POSITIVE ENGAGEMENT TO A HOOK

(75) Inventor: Donald J. Link, Shakopee, MN (US)

(73) Assignee: Skirts Plus Corporation, Savage, MN (US)

(*) Notice: Subject to any disclaimer, the term of this patent is extended or adjusted under 35 U.S.C. 154(b) by 0 days.

(21) Appl. No.: 10/180,724

(22) Filed: Jun. 26, 2002

(51) Int. Cl.[7] ............................................. A01K 85/00
(52) U.S. Cl. ..................... 43/42.31; 43/42.09; 24/698.3
(58) Field of Search ................ 43/42.31, 42.37, 43/42.24, 42.38, 42.39, 4.5, 42.41, 42.09, 42.29, 17.6; 24/698.1, 698.3

(56) References Cited

U.S. PATENT DOCUMENTS

| | | | | |
|---|---|---|---|---|
| 82,469 A | * | 9/1868 | Wood ........................ 24/698.3 |
| 405,886 A | * | 6/1889 | Herrick ...................... 24/700 |
| 499,225 A | * | 6/1893 | Hayes ......................... 24/684 |
| 658,115 A | * | 9/1900 | Murray ....................... 24/698.3 |
| 1,042,753 A | * | 10/1912 | Barton ....................... 24/698.3 |
| 2,736,123 A | * | 2/1956 | Peterson ..................... 43/42.09 |
| 2,910,800 A | | 11/1959 | Cicala |
| 2,992,507 A | * | 7/1961 | Gray .......................... 43/42.09 |
| 3,693,279 A | * | 9/1972 | Mackie ....................... 43/42.06 |
| 3,935,660 A | * | 2/1976 | Plew .......................... 43/42.31 |
| 4,791,750 A | * | 12/1988 | Gammill ..................... 43/42.31 |
| 4,827,657 A | * | 5/1989 | Slehofer ...................... 43/44.2 |
| 4,918,854 A | * | 4/1990 | Webre, Jr. ................... 43/42.31 |
| 5,001,856 A | | 3/1991 | Gentry |
| 5,038,513 A | | 8/1991 | Hardin |
| 5,070,639 A | * | 12/1991 | Pippert ....................... 43/42.31 |
| 5,121,568 A | * | 6/1992 | Lindmeyer ................. 43/42.31 |
| 5,230,178 A | | 7/1993 | Dillard |
| D362,486 S | * | 9/1995 | Short et al. ................. 43/42.31 |
| 5,499,471 A | | 3/1996 | Foutch et al. |
| 5,517,782 A | | 5/1996 | Link et al. |
| 5,890,315 A | * | 4/1999 | Norton ....................... 43/42.31 |
| 5,901,494 A | * | 5/1999 | Reed .......................... 43/44.81 |
| 5,946,847 A | * | 9/1999 | North ......................... 43/42.31 |
| 6,233,863 B1 | * | 5/2001 | Dotson ....................... 43/42.09 |

OTHER PUBLICATIONS

Quinn, "Rigging Wrinkles That Turn Tough Bass," In–Fisherman, vol. 19, No. 4 May–Jun. 1994.

* cited by examiner

Primary Examiner—Peter M. Poon
Assistant Examiner—Joan M. Olszewski
(74) Attorney, Agent, or Firm—Altera Law Group LLC

(57) ABSTRACT

A method-and apparatus for attracting fish using a sound producing fishing accessory the mimics the sound of a fish's prey. The apparatus provides blind positive engagement of a hook and a sound producing device embedded with an artificial bait. A fisherman is able to positively engage the sound producing device to the hook by feel alone. The sound producing device is designed and adapted to guide a hook into positive engagement therewith. The sound producing device may be adapted to include additional fishing accessories in a variety of embodiments

5 Claims, 6 Drawing Sheets

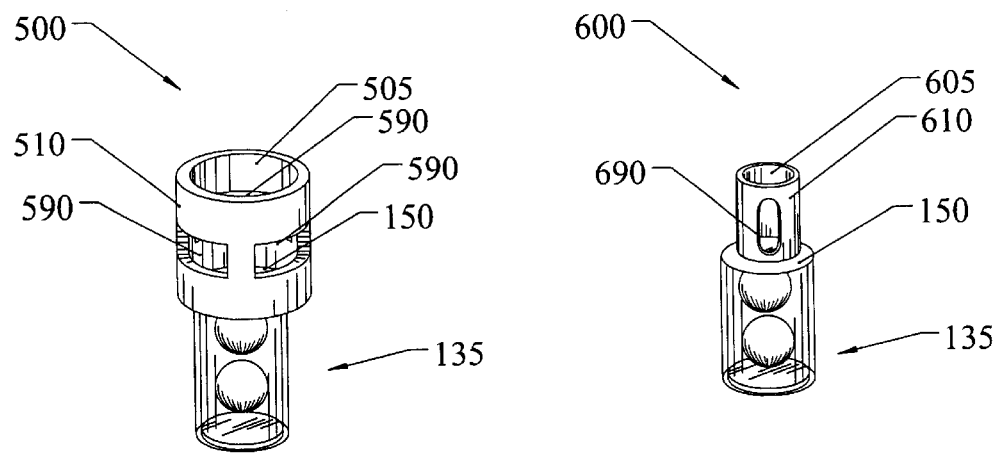
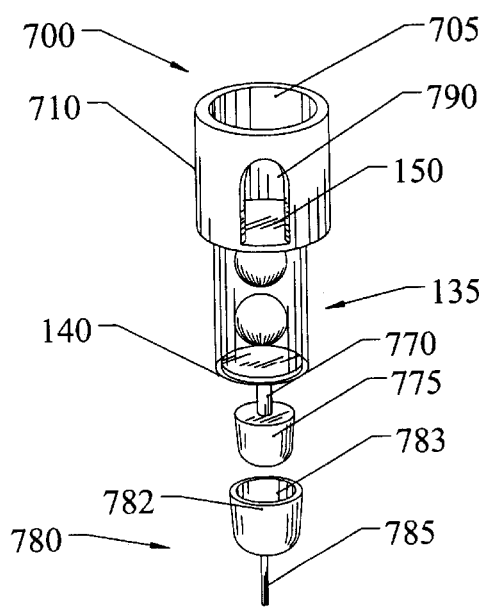
Fig. 5
Fig. 6
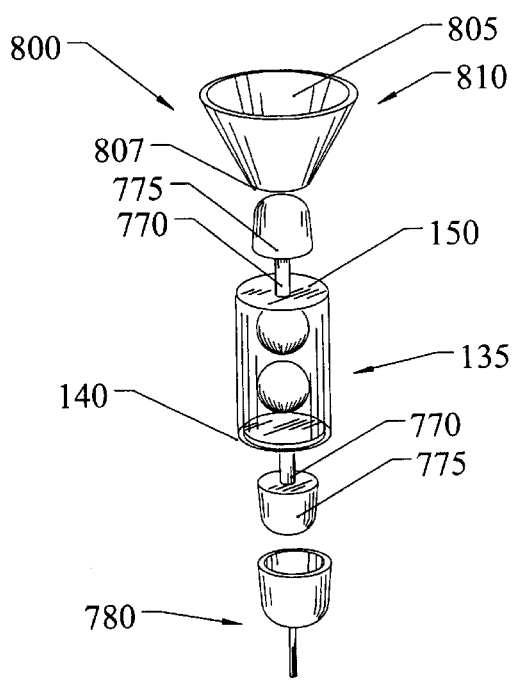
Fig. 7
Fig. 8

METHOD AND APPARATUS FOR ATTRACTING FISH USING A SOUND PRODUCING FISHING ACCESSORY PROVIDING BLIND POSITIVE ENGAGEMENT TO A HOOK

FIELD OF THE INVENTION

The invention relates in general to fishing and fishing equipment, and more particularly to a sound producing fishing accessory for attracting a fish by mimicking sounds of a fish's prey, the accessory being designed and adapted to provide blind positive engagement to a fishing hook.

BACKGROUND OF THE INVENTION

The primary goal of fishing lure design is in improving the probability of catching fish. It has been found that using a sound producing apparatus can induce a fish to strike, particularly when the sound producing apparatus mimics the sound of a fish's natural prey. Such apparatus have been attached to fishing hooks with varying results.

Some of these noise making apparatus have included clips or snaps that attach to the shaft of a fishing hook. These apparatus can be effective when the hook is easily visible and accessible to the fisherman. However, this type of attachment has some disadvantages.

Prior art noise making apparatus are frequently lost. The apparatus may be lost during a strike by the thrashing of the fish. The clips or snaps may become worn and the apparatus fails to remain attached to the fishing hook. This may results in the noise making apparatus flying off the fishing hook while being cast out or becoming dislodged by underwater obstacles when the hook is being reeled in. Losing fishing equipment costs a fisherman money, and worse, may cause early termination of a fishing trip if spares are not on hand.

At night or in poor lighting conditions, it is difficult for the fisherman to securely attach the noise making apparatus to the fishing hook. If the hook already has bait, a lure, or other fish attracting device attached, it is difficult to determine whether the noise making device is securely attached to the hook or lure. It is desirable to provide a method of attachment of a noise producing fishing accessory that makes fishing easier, more enjoyable and more productive.

It can be seen that there is a need for a sound producing fishing accessory and a method for attachment of a sound producing fishing accessory that overcomes the disadvantages of the prior art. It can also be seen that there is a need for a sound producing fishing accessory that provides fish attracting sounds that mimic the noises made by a fish's prey that can be simply and positively attached to a fishing hook under blind conditions.

SUMMARY OF THE INVENTION

To overcome the limitations in the prior art described above, and to overcome other limitations that will become apparent upon reading and understanding the present specification, the present invention discloses a method and apparatus for attracting fish using a sound producing fishing accessory providing blind positive engagement to a hook.

In one embodiment of the present invention, a hook engaging member for blindly connecting a fishing accessory to a fishing hook includes a hook path opening for guiding the hook into an interior of the hook engaging member. A hook receiving orifice forms an outlet from the interior of the hook engaging member. The hook engaging member includes a mating portion for attaching the fishing accessory to the hook engaging member. Connecting the hook to the hook engaging member provides positive engagement therebetween.

The hook receiving orifice may be formed by piercing the hook engaging member with the hook during connection of the hook to the hook engaging member. The hook receiving orifice may include a plurality of orifices disposed in a top portion of the hook engaging member. The hook receiving orifice may be disposed along a side portion of the hook engaging member.

In another embodiment of the present invention, a combination fishing lure includes a bait, a hook having an eye at a proximal end of the hook and a barbed point at a distal end of the hook, and a sound producing fishing accessory attachable to the hook. The sound producing fishing accessory includes a rattle chamber, at least one rattling element disposed within an interior of the rattle chamber, and a hook engaging member. The hook engaging member is disposed at an end of the rattle chamber and includes a hook path opening for guiding the hook into an interior of the hook engaging member. Connecting the hook to the hook engaging member provides blind positive engagement of the hook to the sound producing accessory through a hook receiving orifice. The hook receiving orifice forms an outlet from the interior of the hook engaging member.

The combination fishing lure may include a detent at a proximal portion of the hook. The detent provides positive locking engagement with the hook engaging member of the rattle chamber. The rattle chamber may further include a plugging element, the plugging element is inserted into an opening in an end of the rattle chamber to close the end of the rattle chamber. The plugging element and the rattling element can be formed of identical or different materials to produce a distinct sound when impacting one another.

The combination fishing lure may include a connecting device attached to one end of the rattle chamber, the connecting device providing attachment of additional fishing accessories to the sound producing device. The additional fishing accessories may include light emitting devices, treble hooks, skirts, standard hooks, corkscrew accessories and spinning blades. The connecting device for providing attachment of additional fishing accessories can include a flanged head extending from the plugging element by a stem. The flanged head is adapted to be received into and retained in a reciprocating orifice, the reciprocating orifice being connected by an extension to a fishing accessory.

In one configuration of the fishing lure, the bait is an artificial bait. The artificial bait is provided with at least one slot adapted to receive the sound producing fishing accessory therein. An interior of the artificial bait may not be visible from an exterior of the artificial bait.

The hook engaging member can be formed integral with the rattle chamber or be formed as a separate element fixably or removably connected to the rattle chamber. The rattling element of the fishing lure may be selected from the group consisting of plastic beads, glass beads and metal ball bearings. The rattle chamber may be adapted to receive at least one weight at an end thereof.

The combination fishing can be used with a live bait. The sound producing device is inserted into a belly cavity of the live bait prior to blind positive engagement with the hook. In this configuration, the sound producing device is inserted into a mouth of the live bait prior to blind positive engagement with the hook.

In another embodiment of the present invention, a sound producing fishing accessory for attachment to a hook includes a rattle chamber, at least one rattling element disposed within an interior of the rattle chamber, and a hook engaging member. The hook engaging member is disposed at an end of the rattle chamber. The hook engaging member includes a hook path opening for guiding the hook into an interior of the hook engaging member. Connecting the hook to the hook engaging member provides positive engagement of the hook to the sound producing accessory through a hook receiving orifice that forms an outlet from the interior of the hook engaging member.

In another embodiment of the present invention, a method of blind positive engagement of a fishing hook to a fishing accessory involves inserting the fishing accessory into an enclosed element that obscures visibility of the fishing accessory. A point of the hook is inserted through the enclosed element and into a hook path opening in an interior of a hook engaging member disposed at an end of the fishing accessory until the hook abruptly impacts a top of the fishing accessory. The hook is twisted, turned or pushed within the hook path opening through a hook receiving orifice that forms an outlet from an interior of the hook engaging member. The hook is pushed and turned into the enclosed element and through the hook receiving orifice until a detent of the hook is engaged within the hook receiving orifice. The hook is set into the enclosed element and pulled to ensure that the hook is positively engaged to the fishing accessory.

The method may include a fishing accessory having a rattle chamber and at least one rattling element disposed within an interior of the rattle chamber. The fishing accessory may be selected from the group consisting of at least light emitting devices, treble hooks, skirts, standard hooks, corkscrew accessories and spinning blades. The method may further involve attaching at least one weight to the fishing accessory.

In one aspect of the method, twisting, turning or pushing the hook within the hook path opening through a hook receiving orifice involves forming the hook receiving orifice by piercing the hook engaging member with the hook.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 illustrates another sound producing fishing accessory according to an embodiment of the present invention;

FIG. 6 illustrates another sound producing fishing accessory according to an embodiment of the present invention;

FIG. 7 illustrates another sound producing fishing accessory according to an embodiment of the present invention;

FIG. 8 illustrates another sound producing fishing accessory according to an embodiment of the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for attracting fish using a sound producing fishing accessory providing blind positive engagement to a hook. The fishing accessory is designed and adapted to providing a sound for attracting fish by mimicking sounds of a fish's prey. The present invention solves the above-described problems by provide blind positive engagement to a fishing hook when the fishing accessory has been inserted into an opaque soft fishing lure, a rubber fishing worm or a live bait.

Figures 1, 2:
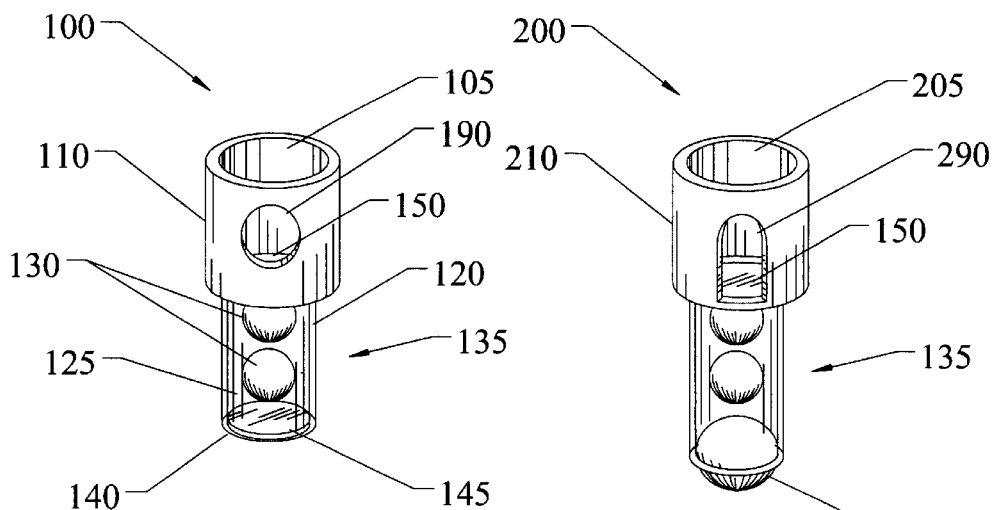
FIG. 1 illustrates a sound producing fishing accessory according to an embodiment of the present invention.
FIG. 2 illustrates another sound producing fishing accessory according to an embodiment of the present invention.

FIG. 1 illustrates a sound producing fishing device 100 according to an embodiment of the present invention. In FIG. 1, the sound producing device 100 is shown having a bottom 140, a top 150, a side wall 120 and an interior 125 forming a rattle chamber 135. At least one ball 130 is disposed in the interior 125 of the rattle chamber 135. A hook engaging member 110 is disposed on the top 150 of the rattle chamber 135. The hook engaging member 110 includes a hook path opening 105 disposed in a top portion of the hook engaging member 110 and a hook receiving orifice 190 disposed along a side of the hook engaging member 110.

FIG. 2 illustrates another sound producing fishing device 200 according to an embodiment of the present invention. In FIG. 2, the sound producing device 200 includes a rattle chamber 135. A hook engaging member 210 is disposed on the top 150 of the rattle chamber 135. The hook engaging member 210 includes a hook path opening 205 disposed in a top portion of the hook engaging member 210 and a hook receiving orifice 290 disposed along a side of the hook engaging member 210.

Figures 3, 4, 4A:
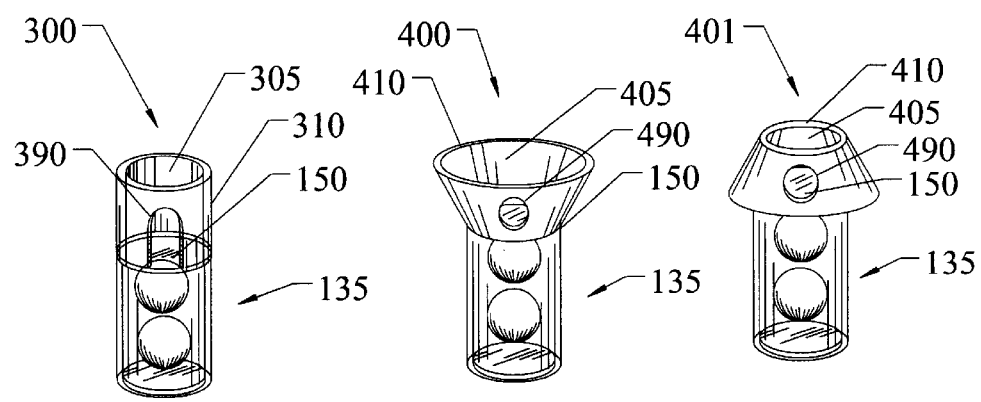
FIG. 3 illustrates another sound producing fishing accessory according to an embodiment of the present invention.
FIG. 4 illustrates another sound producing fishing accessory according to an embodiment of the present invention.
FIG. 4A illustrates another sound producing fishing accessory according to an embodiment of the present invention.

FIG. 3 illustrates another sound producing fishing device 300 according to an embodiment of the present invention. In FIG. 3, the sound producing device 300 includes a rattle chamber 135. A hook engaging member 310 is disposed on the top 150 of the rattle chamber 135. The hook engaging member 310 includes a hook path opening 305 disposed in a top portion of the hook engaging member 310 and a hook receiving orifice 390 disposed along a side of the hook engaging member 310.

FIG. 4 illustrates another sound producing fishing device 400 according to an embodiment of the present invention. In FIG. 4, the sound producing device 400 includes a rattle chamber 135. A hook engaging member 410 is disposed on the top 150 of the rattle chamber 135. The hook engaging member 410 includes a hook path opening 405 disposed in a top portion of the hook engaging member 410. The hook engaging member 410 can be tapered so that the top portion is wider than the top of the rattle chamber 135.

The embodiment of FIG. 4 is adapted and designed such that a hook receiving orifice can be formed by insertion of the hook through the hook engaging member 410. The hook may pierce the material from which the hook engaging member 410 is fabricated. The material from which the hook engaging member 410 may be fabricated from may include plastisol, urethane, poly-urethane, poly-vinyl chloride, poly-ethylene terephthalate or any other rubber or plastic compound which may be pierced but retains its tensile strength. Alternatively, the hook engaging member 410 may be fabricated from these or other materials (e.g. lead) and include a hook receiving orifice 490 similar to other embodiments disclosed herein.

The sound producing fishing device 401 shown in FIG. 4A is similar to the device 400 shown in FIG. 4, except that the hook engaging member 410 is tapered so that the top portion is narrower than the top of the rattle chamber 135. The taper may make it easier to pierce the hook engaging member 410 in configurations where no hook receiving orifice 490 is formed. The lower edge of the tapered hook engaging member 410 is shown extending beyond the periphery of the rattle chamber 135, and in this way can help prevent the fishing device 401 from becoming dislodged from a surrounding bait or skirt.

FIG. 5 illustrates another sound producing fishing accessory according to an embodiment of the present invention 500. In FIG. 5, the sound producing device 600 includes a rattle chamber 135. A hook engaging member 510 is disposed on the top 150 of the rattle chamber 135. The hook engaging member 510 includes a plurality of hook path openings 505 disposed in a top portion of the hook engaging member 510 and a hook receiving orifice 590 disposed along a side of the hook engaging member 510. The openings 505 are typically distributed around the periphery of the hook engaging member 510 and thereby allowing a plurality of allowable hook engagement paths.

FIG. 6 illustrates another sound producing fishing device 600 according to an embodiment of the present invention. In FIG. 6, the sound producing device 600 includes a rattle chamber 135. A hook engaging member 610 is disposed on the top 150 of the rattle chamber 135. The hook engaging member 610 includes a hook path opening 605 disposed in a top portion of the hook engaging member 610 and a hook receiving orifice 690 disposed along a side of the hook engaging member 610.

FIG. 7 illustrates another sound producing fishing device 700 according to an embodiment of the present invention. In FIG. 7, the sound producing device 700 includes a rattle chamber 135. A hook engaging member 710 is disposed on the top 150 of the rattle chamber 135. The hook engaging member 710 includes a hook path opening 705 disposed in a top portion of the hook engaging member 710 and a hook receiving orifice 790 disposed along a side of the hook engaging member 710.

Disposed on the bottom 140 of the rattle chamber 135 is a flanged head 775 extending from a stem member 770. The flanged head 775 is adapted and designed to retain a fishing accessory 780. The fishing accessory 780 is provided with a connecting device 782 having a reciprocating orifice 783 which is adapted and designed to receive and retain the flanged head 775 therein. The connecting device may also be provided with an extension 785 to allow the fishing accessory 780 to be disposed at some distance from the sound producing device 700. The additional fishing accessory 780 may include additional sound producing devices, light emitting devices and other fish attracting devices.

FIG. 8 illustrates another sound producing fishing device 800 according to an embodiment of the present invention. In FIG. 8, the sound producing includes a rattle chamber 135. A hook engaging member 810 is disposed on the top 150 of the rattle chamber 135. The hook engaging member 810 includes a hook path opening 805 disposed in a top portion of the hook engaging member 810. A hook receiving orifice may be manually formed by piercing a hook through a side wall of the hook engaging member 810.

Disposed from both the top 150 and the bottom 140 of the rattle chamber 135 is a flanged head 775 extending from a stem member 770. The flanged heads 775 are adapted and designed to retain a fishing accessory 780 as previously described or a hook engaging member 810. The hook engaging member 810 is provided with a reciprocating orifice 807 designed and adapted to receive and retain the flange head 775 therein.

The embodiment of FIG. 8 is adapted and designed such that a hook receiving orifice can be formed by insertion of a hook through the hook engaging member 810. The hook may pierce the material from which the hook engaging member 810 is fabricated. The material from which the hook engaging member 810 may be fabricated from includes plastisol, urethane, poly-urethane, poly-vinyl chloride, poly-ethylene terephthalate or any other rubber or plastic compound which may be pierced but retains its tensile strength.

The rattle chamber 135 of the sound producing devices described above in reference to FIGS. 1–8, may be fabricated from an elastomer material, such as polycarbonate, molded plastic, rubber or polyvinyl. A variety of elastomer materials may be used, provided the material is capable of withstanding freshwater and saltwater environments and exposure to sunlight, heat and other external abuses to which fishing lures are normally subjected.

The rattle chamber 135 has been disclosed being a generally tubular structure, but the chamber 135 is not limited to this structure and other structures may be implemented. In some instances the bottom 140 of the rattle chamber 135 may be formed closed in the manufacturing process, while in other instances the bottom 140 may be left open during manufacturing. In the case where the bottom 140 has been left open, upon placing at least one ball or bead 130 into the interior of the rattle chamber 135, the bottom 140 may be plugged with a plugging device 145 (best seen in FIG. 1). The ball or beads 130 may be metal ball bearings, plastic balls, glass beads or other materials that produce a distinct sound when impacting another ball or the interior wall of the rattle chamber 135.

The plugging device 145 may be an enlarged ball or bead (best seen in FIG. 2), which once place into the opening is firmly secured therein. The plugging device 145 may be formed of the same material as the balls or beads 130 or may formed of a different material. The plugging device 145 may also be provided with an hole or loop to facilitate connection of a fishing accessory. As shown in FIGS. 7 and 8, the plugging device 145 be provided with a flanged head 775 located on a stem 770 extending from the plugging device 145, the flanged head 775 facilitating connection of a fishing accessory 780 or a hook engaging member to the bottom of the sound producing device.

Fabricating the plugging device 145 and the balls or beads 130 from identical materials produces a characteristic and distinct sound. Additionally, fabricating the plugging device 145 and the balls or beads 130 from different materials also produces characteristic and distinct sound patterns. In some circumstances, depending upon the intensity of the impact that occurs, the shape of the rattle chamber 135, the plugging device 145 and the balls or beads 130 in the rattle chamber 135, resonance sound patterns may be produced. When resonance patterns of sound are produced, the sound waves leave the sound producing device with greater intensity and the sound waves travel farther in the water before diminishing substantially. The more intense resonance sound instinctively triggers more dramatic fish strikes. The more intense resonance sound also is more interesting especially to larger fish and triggers the larger generally lazy fish into striking.

The rattle chamber 135 may also be a tubular structure open at both ends. The open ends may each receive plugging devices to facilitate connection of fishing accessories or hook engaging members as previously disclosed.

The hook engaging members 110, 210, 510 disclosed in reference to FIGS. 1, 2 and 5, may be fabricated of a material that is different than the material from which the rattle chamber 135 has been formed. For example, the hook engaging member 110, 210, 510 may be formed of a metal such as lead, aluminum, copper, brass, stainless steel, nickel. Fabricating the hook engaging member 110, 210, 510 from metal provides the advantage of adding weight, thereby reducing buoyancy of the sound producing device. The hook engaging member 110, 210, 510 may be formed as part of a plugging device that may be received in an open end of the rattle chamber 135. Alternatively, the hook engaging member 110, 210, 510 may be formed to fit over and around the closed top of the rattle chamber 135, forming a frictional engagement with the rattle chamber 135. In another embodiment the hook engaging member 110, 210, 510 may be provided with threads and the top of the rattle chamber 135 may be provided with threads so that the hook engaging member 110, 210, 510 may be threaded onto the rattle chamber 135.

In FIGS. 3 and 6, the hook engaging member 310, 610 may be formed integral with and of the same material as the rattle chamber 135. The rattle chamber 135 may be formed of a clear, translucent material or may be formed of a colored material which may further attract a fish. The rattle chamber 135 may be painted or colored in some other manner as desired.

The sound producing device disclosed herein may also be used in conjunction with additional fishing accessories. In a further embodiment of the present invention, the sound producing device may be combined with a bait. The bait may be a soft artificial bait designed and adapted to receive a sound producing fishing device therein, a rubber fishing worm or a live bait.

Figure 9:
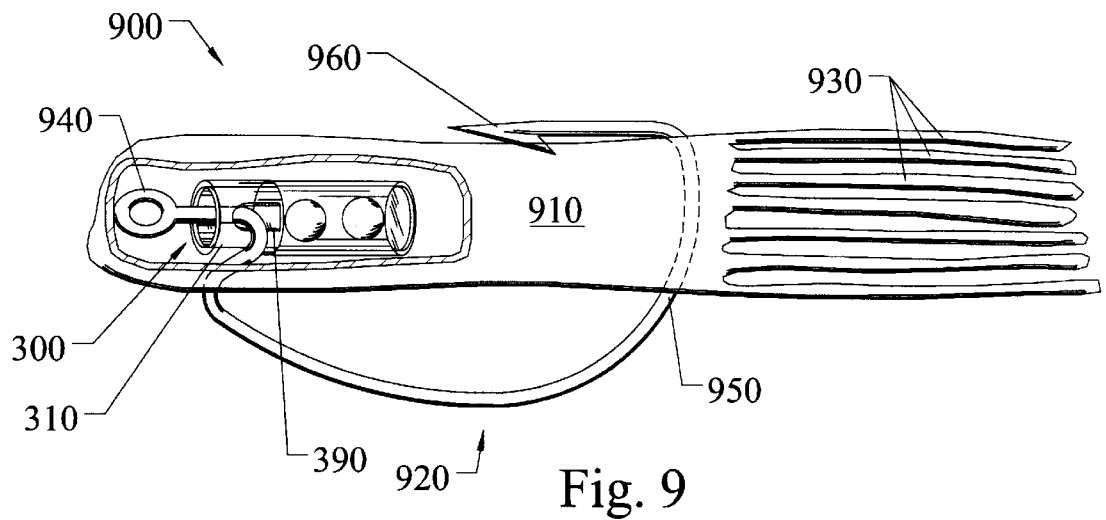
FIG. 9 illustrates blind positive engagement of a sound producing fishing accessory inserted into an artificial bait according to an embodiment of the present invention.

FIG. 9 illustrates a lure assembly 900 with blind positive engagement of an exemplary sound producing device 300 inserted into an artificial bait 910 according to an embodiment of the present invention. The sound producing device 300 is shown embedded within the soft artificial bait 910 and positively engaged with a fishing hook 920. The fishing hook 920 is disposed within path opening 305 of hook engaging member 310. For purposes of explanation, the artificial bait 910 is shown in cutaway to reveal the sound producing device 300 therein. The artificial bait 910 may be provided with a pre-formed slot (not shown) that is adapted and designed to receive the hook 920 and sound producing device 300 therein.

The soft artificial bait 910 is provided with a plurality of tails 930 forming a skirt at a trailing end thereof. The hook 920 is shown having an eye 940, a stem 950, and a barbed point 960, and is engaging the artificial bait 910. The hook 920 is shown positively engaging both the soft artificial bait 910 and the sound producing devices through the hook receiving opening 390. The sound producing device is securely retained in the soft artificial bait 910 by the hook 920 and is prevented from being dislodged from the artificial bait 910 and becoming lost.

It is appreciated that the configuration illustrated in FIG. 9 can include a sound producing device according to any of the embodiments 100, 200, 300, 400, 500, 600, 700, and 800 previously described. Each of the various embodiments can be similarly disposed on the fishing hook 920 and enclosed within the artificial bait 910.

Figure 10:
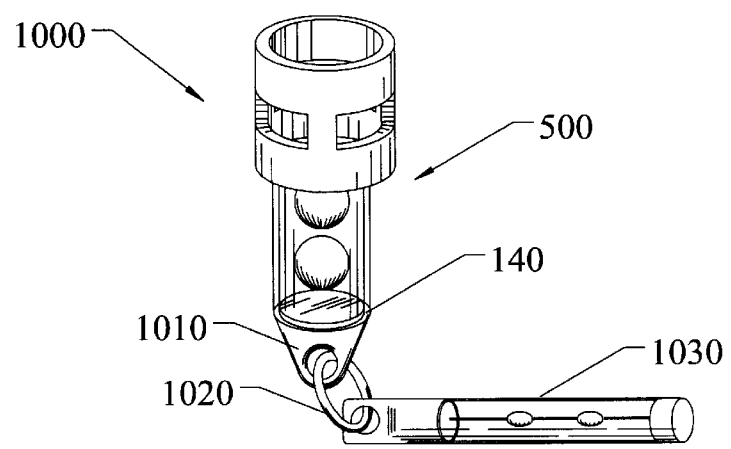
FIG. 10 illustrates a sound producing fishing accessory having a further fish attracting element attached thereto according to an embodiment of the present invention.

FIG. 10 illustrates a sound producing fishing accessory 1000 having a further fish attracting element attached thereto according to an embodiment of the present invention. The accessory 1000 includes an exemplary embodiment of a sound producing device 500 with a connecting device 1010 disposed at a bottom 140 thereof. The connecting device 1010 facilitates connection of additional fish attracting devices. A ring 1020 couples the connecting device 1010 through a small orifice to a fish attracting device 1030, in this instance a light emitting body. It is appreciated that other fishing devices, including a skirt, a standard hook, a spinning blade, a treble hook, and a corkscrew fishing accessory may be attached similarly to the accessory 1000.

Figure 11:
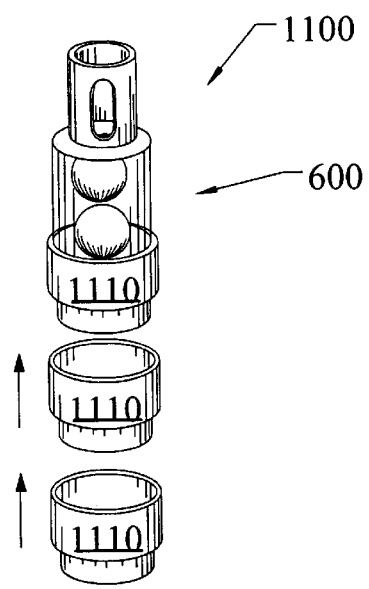
FIG. 11 illustrates a sound producing fishing accessory having an additional fishing accessory attached thereto according to an embodiment of the present invention.

FIG. 11 illustrates a sound producing fishing accessory 1100 according to an embodiment of the present invention. The accessory 1100 includes an exemplary embodiment of a sound producing device 600 with a weight 1110 frictionally disposed on a bottom portion thereon. A plurality of frictional weights 1110 may be further disposed on the accessory 1100. The weights 1110 are adapted and designed to frictionally connect with each other via reciprocating projections and orifices.

Figure 12:
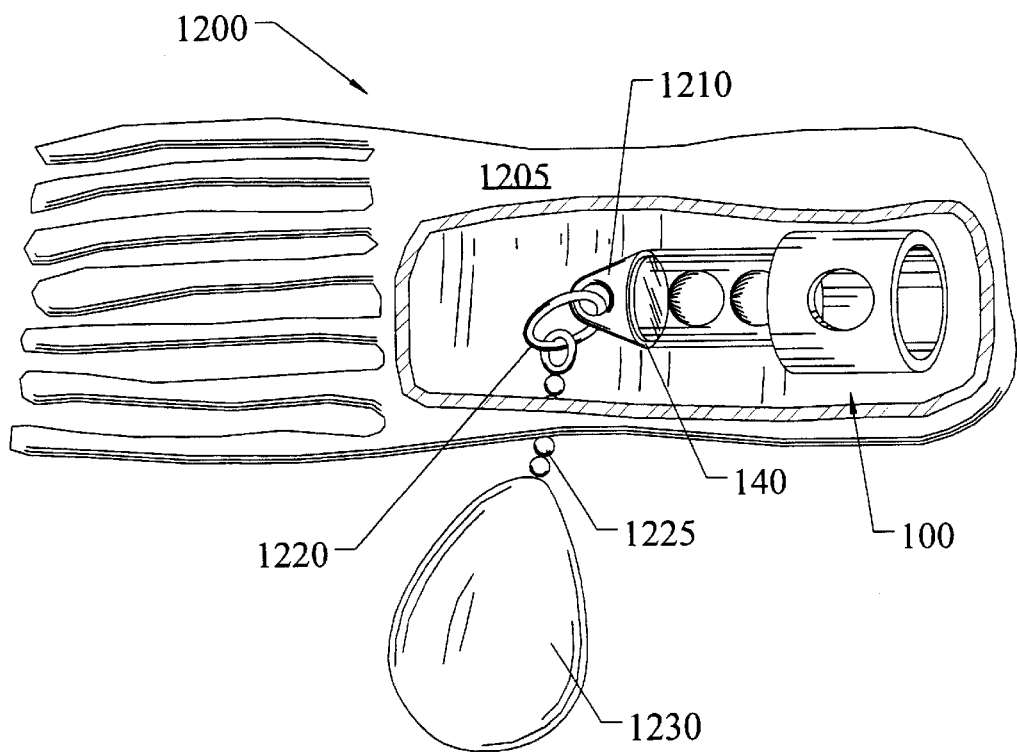
FIG. 12 illustrates a sound producing fishing accessory having an additional fishing accessory attached thereto according to an embodiment of the present invention.

FIG. 12 illustrates a sound producing fishing accessory 1200 according to an embodiment of the present invention. The accessory 1200 includes an exemplary sound producing device 100 inserted into an artificial bait 1205 prior to blind positive engagement with a fishing hook. The accessory 1200 includes a connecting device 1210 disposed at a bottom 140 of the sound producing device 100. A ring 1220 couples the connecting device 1210 to a chain 1225 attaching a fishing device 1230, in this instance a spinning blade. It is appreciated that other fishing devices, including a skirt, a standard hook, a light assembly 1030, weights 1110, and a corkscrew fishing accessory may be attached similarly to the assembly 1200.

Figure 13:
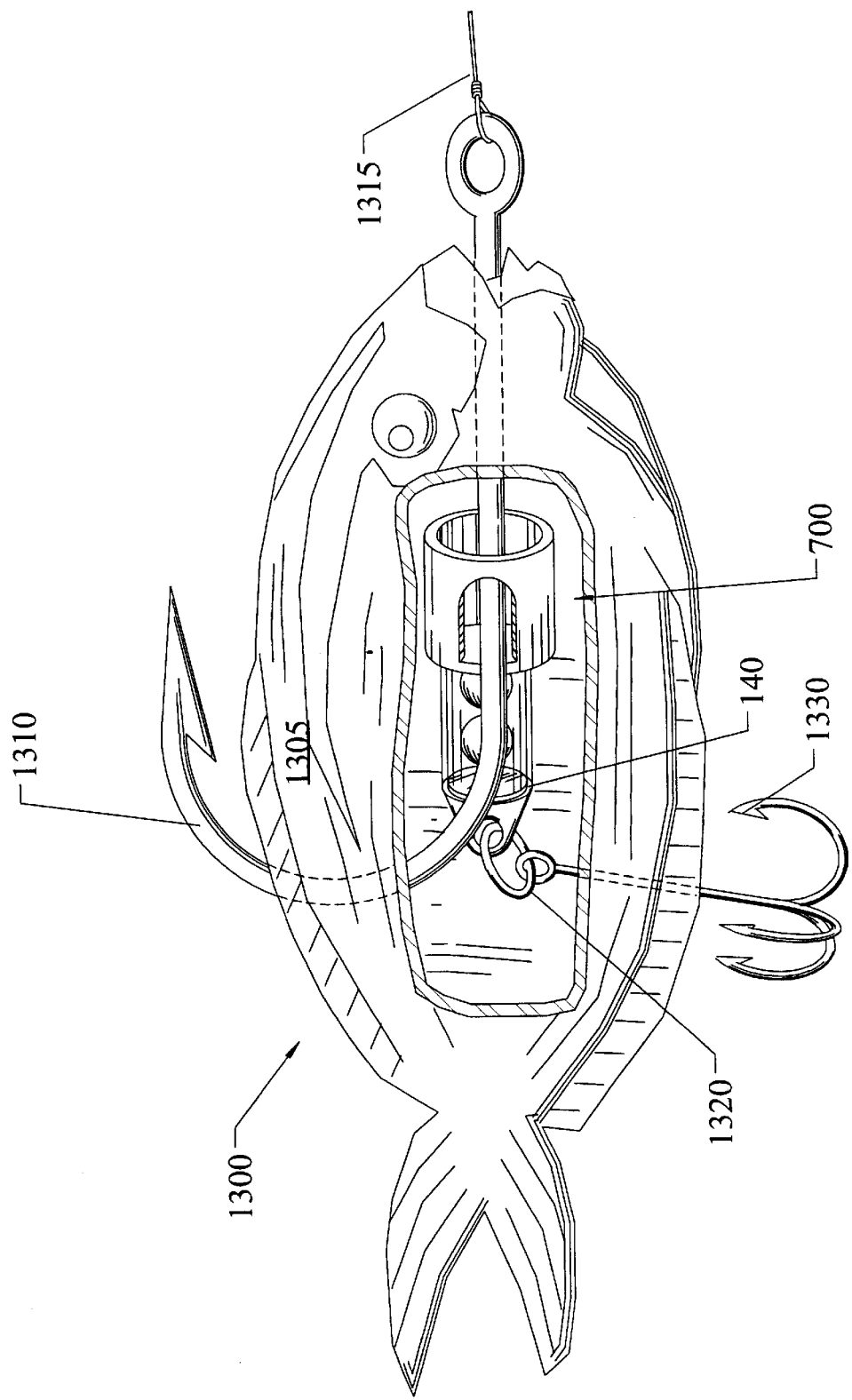
FIG. 13 illustrates a sound producing fishing accessory having an additional fishing accessory attached thereto inserted into a live bait and connected via blind positive engagement with a fishing hook according to an embodiment of the present invention.

FIG. 13 illustrates a sound producing fishing accessory 1300 according to an embodiment of the present invention. An exemplary sound producing device 700 has been inserted into the belly cavity of a live bait 1305. Because the sound producing device 700 is an embodiment having an additional fishing accessory connected thereto, in this instance a ring 1320 and treble hook 1330, the sound producing device 700 is inserted into the belly cavity from a rear end of the live bait 1305 and pushed forward inside the bait 1305 until the sound producing device 700 resides in the mouth or throat area of the bait 1305. The hook 1310 is shown in positive engagement with the sound producing device 700 and a fishing line 1315 is shown attached to the hook 1310. When implementing a sound producing device of another embodiment that does not include any additional fishing accessories connected thereto, the sound producing device may be inserted into the mouth of the live bait 1305 and pushed down the throat. The hook 1310 may then be positively engaged with the sound producing device in the throat or belly area of the fish.

Figure 14:
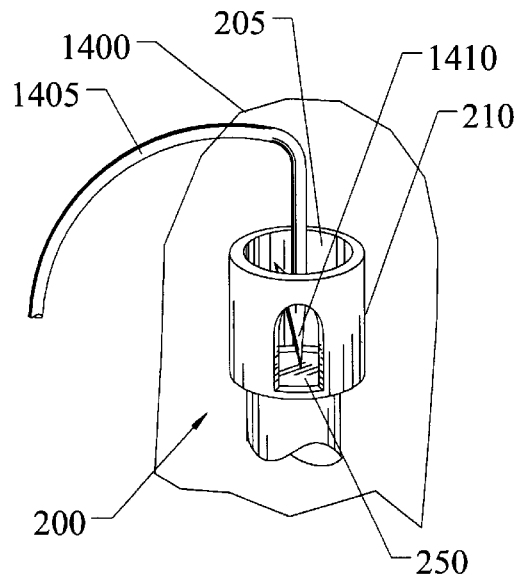
FIG. 14 illustrates a step in the method of blind positive engagement of a sound producing fishing-accessory embedded in a bait to a fishing hook according to an embodiment of the present invention.

FIG. 14 illustrates a step in the method of blind positive engagement of a sound producing device 200 in an enclosed element that obscures the view of the sound producing device 200 according to an embodiment of the present invention. In this example, the sound producing device is embedded in bait 1400 (shown in outline only) to a fishing hook 1405. Although the method is illustrated with one embodiment 200 of a sound producing device, the method is applicable to all the other embodiments of sound producing devices disclosed herein. The point 1410 of the hook 1405 is inserted into the bait 1400 in a downward direction. The point 1410 of the hook 1405 continues to penetrate into the hook path opening 205 of the hook engaging member 210 until the point 1410 impacts the top 250 of the sound producing device 200. The fisherman thereby receives positive notice that the hook point 1410 is engaging the sound producing device 200 embedded within the bait 1400.

Figure 15:
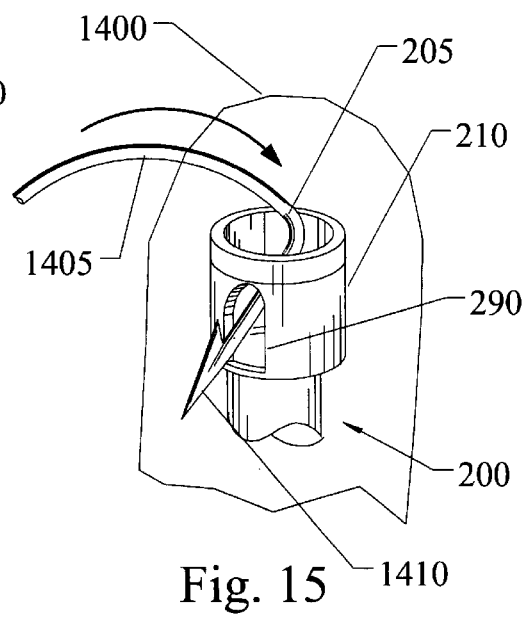
FIG. 15 illustrates another step in the method of blind positive engagement of a sound producing fishing accessory embedded in a bait to a fishing hook according to an embodiment of the present invention.

Turning now to FIG. 15, the hook 1405 is shown after the hook point 1410 has impacted the top of the sound producing device 200. The hook 1405 is turned and/or twisted according to the direction of the curved arrow inside the hook path opening 205 of the hook engaging member 210. The point 1410 finds the hook receiving orifice 290 and penetrates therethrough, out of the hook engaging member 210 and out of the bait 1400.

Figure 16:
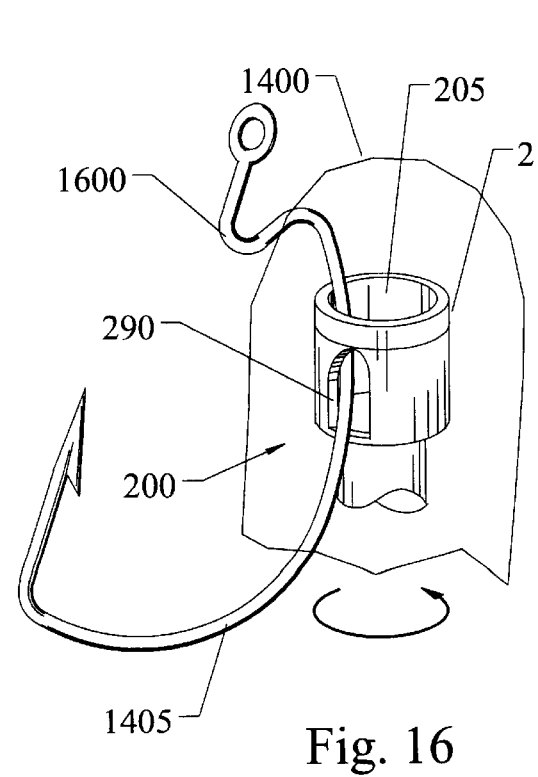
FIG. 16 illustrates another step in the method of blind positive engagement of a sound producing fishing accessory embedded in a bait to a fishing hook according to an embodiment of the present invention.

FIG. 16 illustrates another step in the method of engaging the sound producing device 200 on the hook 1405. The hook 1405 includes a detent 1600 that can be used to engage the hook 1405 within the device 200. Upon exiting the hook receiving orifice 290 of the hook engaging member 210, the hook 1405 is pushed downwards into the hook engaging member 210 until the detent 1600 of the hook 1405 engages the hook engaging member 210. The hook 1405 is then turned and rotated in the direction of the curved arrow such that the point 1410 of the hook 1405 points in the opposite direction from configuration shown in FIG. 16.

Figure 17:
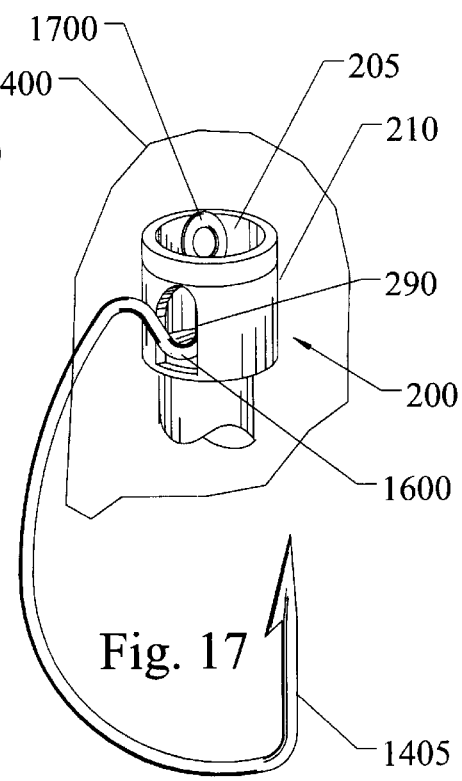
FIG. 17 illustrates another step in the method of blind positive engagement of a sound producing fishing accessory embedded in a bait to a fishing hook according to an embodiment of the present invention.

FIG. 17 illustrates the engagement of the detent 1600 within the device. The top 205 of the sound producing device 200 has engaged the detent 1600. The point 1410 of the hook 1405 can then pushed into the bait 1400. The hook 1450 can then be pulled in an upwards direction. The hook 1405 makes a positive engagement with the receiving orifice 290 of the sound producing device 200.

The steps of the method illustrated in FIGS. 14–17 are capable of being performed by feel by a fisherman. The fisherman will be able to feel the engagement of the hook 1405 with the hook engaging member 210 throughout the hook insertion process. A sharp tug on the hook 1405 by application of a fishing line attached to the eye 1700 does not remove the hook 1405 from the bait 1400 or the sound producing device 200 because the detent 1600 of the hook 1400 positively engages a portion of the hook receiving orifice 290. The action of the detent 1600 orifice 290 thereby prevents the hook from being accidentally pulled out and prevents the sound producing device 200 from accidentally being lost.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of blind positive engagement of a fishing hook to a fishing accessory, the method comprising:

inserting the fishing accessory into an enclosed element that obscures visibility of the fishing accessory;

inserting a point of the hook through the enclosed element and into a hook path opening in an interior of a hook engaging member disposed at an end of the fishing accessory until the hook abruptly impacts a top of the fishing accessory;

twisting, turning or pushing the hook within the hook path opening through a hook receiving orifice that forms an outlet from an interior of the hook engaging member;

pushing and turning the hook into the enclosed element and through the hook receiving orifice until a detent of the hook is engaged within the hook receiving orifice; and setting the hook into the enclosed element and pulling on the hook to ensure that the hook is positively engaged to the fishing accessory.

2. The method of claim 1, wherein the fishing accessory comprises a rattle chamber and at least one rattling element disposed within an interior of the rattle chamber.

3. The method of claim 1, wherein the fishing accessory is selected from the group consisting of at least light emitting devices, treble hooks, skirts, standard hooks, corkscrew accessories and spinning blades.

4. The method of claim 1, further comprising attaching at least one weight to the fishing accessory.

5. The method of claim 1, wherein twisting, turning or pushing the hook within the hook path opening through a hook receiving orifice comprises forming the hook receiving orifice by piercing the hook engaging member with the hook.

* * * * *